US007798690B2

(12) United States Patent
Watanabe et al.

(10) Patent No.: US 7,798,690 B2
(45) Date of Patent: Sep. 21, 2010

(54) VEHICLE HEADLAMP

(75) Inventors: Shigeyuki Watanabe, Shizuoka (JP); Tetsuaki Inaba, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 427 days.

(21) Appl. No.: 11/492,663

(22) Filed: Jul. 25, 2006

(65) Prior Publication Data

US 2007/0025117 A1 Feb. 1, 2007

(30) Foreign Application Priority Data

Jul. 29, 2005 (JP) ............................ 2005-220461

(51) Int. Cl.
*B60Q 1/00* (2006.01)

(52) U.S. Cl. ....................... 362/539; 362/545; 362/543; 362/549; 362/517; 362/521; 362/368; 362/432

(58) Field of Classification Search ................. 362/539, 362/545, 544, 543, 517, 521, 549, 368, 432
See application file for complete search history.

(56) References Cited

U.S. PATENT DOCUMENTS

| | | | | |
|---|---|---|---|---|
| 1,027,306 | A * | 5/1912 | Avery | 362/549 |
| 5,597,232 | A * | 1/1997 | Ohashi et al. | 362/265 |
| 5,895,113 | A * | 4/1999 | Ozaki et al. | 362/546 |
| 7,201,507 | B2 * | 4/2007 | Takeda et al. | 362/545 |
| 7,258,466 | B2 * | 8/2007 | Watanabe et al. | 362/294 |
| 2004/0202007 | A1 | 10/2004 | Yagi et al. | |
| 2005/0122736 | A1 | 6/2005 | Watanabe et al. | |
| 2005/0201117 | A1 * | 9/2005 | Sugimoto et al. | 362/539 |

FOREIGN PATENT DOCUMENTS

| | | |
|---|---|---|
| DE | 10 2004 017 454 | 1/2005 |
| DE | 10 2004 058 200 | 7/2005 |
| JP | 4-55705 | 5/1992 |
| JP | 2002-299700 | 10/2002 |
| JP | 2004-95480 | 3/2004 |
| JP | 2005-166588 | 6/2005 |

OTHER PUBLICATIONS

Patent Abstracts of Japan, Publication No. 2004-095480, Publication Date: Mar. 25, 2004, 1 page.

(Continued)

*Primary Examiner*—Sandra L O'Shea
*Assistant Examiner*—Jessica L McMillan
(74) *Attorney, Agent, or Firm*—Osha Liang LLP

(57) ABSTRACT

A headlamp including a metal bracket and a plurality of light source units 50, each unit having a light source, being mounted on the metal bracket 20, and being disposed within a lamp chamber. Irradiation light patterns of the light source units 50 are combined together to form a predetermined light distribution pattern. Each of the light source units 50 includes a resin shade 58, which is fastened to the bracket 20 by a fastening portion and is disposed forwardly of the light source, and a resin lens 52 connected to the shade 58. Part of the fastening portion is made of metal.

12 Claims, 12 Drawing Sheets

OTHER PUBLICATIONS

Patent Abstracts of Japan, Publication No. 2005-166588, Publication Date: Jun. 23, 2005, 1 page.

German Office Action for German patent application No. 10 2006 034 781.1-31, dated Jan. 17, 2008, and English translation thereof, 7 pages.

Japanese Notification of Reason for Refusal for U.S. Appl. No. 2005-220461, mailed Apr. 13, 2010, and English translation thereof (6 pages).

Patent Abstracts of Japan for patent application with Publication No. 2002-299700, Publication Date: Oct. 11, 2002, 1 page.

* cited by examiner

Prior Art

VEHICLE HEADLAMP

This application claims foreign priority from Japanese Patent Application No. 2005-220461, filed Jul. 29, 2005, the entire contents of which are hereby incorporated by reference.

BACKGROUND OF THE INVENTION

1. Field of the Invention

This invention relates to a vehicle headlamp in which light irradiation patterns of a plurality of light source units, each having a light-emitting element as a light source, are combined together to form a predetermined light distribution pattern.

2. Description of Related Art

Generally, a headlamp for a vehicle is so constructed in order to form a low-beam light distribution pattern having a cut-off line at an upper end edge thereof so that a forward visibility of the vehicle's driver can be assured as much as possible without providing glare to drivers of oncoming vehicles and others.

In recent years, vehicle headlamps employing a light-emitting element as a light source have been actively developed. In Japanese Patent Publications No. 2004-95480 and 2005-166588, there is proposed a vehicle headlamp in which the light irradiation patterns of a plurality of light source units, each having a light-emitting element as a light source, are superimposed together to form a low-beam light distribution pattern.

According to these publications, light emitted from the light-emitting element 2 used as the light source generates a small amount of heat. As shown in FIG. 12, a lens 4 and a cut-off line-forming shade 6 (which are light distribution control members forming the light unit) are formed of a synthetic resin for the purpose of achieving a lightweight design. A bracket 1 (serving as a unit support member), on which the light-emitting element 2 (the light source) is mounted, is formed by a metal diecast product of good thermal conductivity in order to suppress a temperature increase that would lead to a shortened lifetime, such as reduction of the light emitted by the light-emitting element 2 and a change in luminescent color.

The lens 4 and the shade 6 are connected together by welding or adhesive bonding, and the shade 6 and the bracket 1 are fastened together by a metal fastening screw 8. A bracket 7*a* of a reflector 7 and a bracket 6*a* of the shade 6 are both fastened to the bracket 1 by the fastening screw 8.

In this kind of headlamp, light irradiation patterns, formed respectively by the plurality of light source units, are superimposed together to form a low-beam light distribution pattern. Therefore, positional accuracy (light distribution accuracy for each light source unit) between the lens 4 and the shade 6 (which are the light distribution control members) is naturally required, and the positional accuracy of the light distribution control members (the lens 4 and the shade 6) relative to the bracket 1 is also required. Namely, it is necessary that the optical axes of the light source units should be properly arranged.

Therefore, a positioning projection 6*b* is formed on an abutment surface of the shade 6 for abutting against the bracket 1. With this construction, the positional accuracy of the light distribution control members relative to the bracket 1 is assured.

The lens 4 and the shade 6 (the light distribution control members) are both made of a synthetic resin, and therefore can be precisely integrally connected together by welding or adhesive bonding (that is, the light distribution accuracy for each light source unit can be secured). With respect to the positional accuracy of the resin light distribution control members (the lens 4 and the shade 6) relative to the metallic bracket 1, it is preferred to fasten the shade 6 and the bracket 1 together with a suitable fastening force so that the shade 6 will not shake relative to the bracket 1. However, when the fastening force is increased in order to enhance the positional accuracy, there has been a problem that the positioning projection 6*b* is plastically deformed (buckled), and the positional accuracy is lowered.

In the process of developing structures for screw-fastening the resin shade 6 and the bracket 1 together, there has been proposed one structure in which a screw passage hole is formed through the metal bracket 1, and a metal fastening screw (including a taping screw) is threaded (or screwed) into a fastening portion of the resin shade 6 for the bracket 1 from a rear side (the right side in FIG. 12) of the bracket 1, as in an embodiment of the present invention, thereby fastening the shade 6 to the bracket 1. In this case, when the screwing fastening force is too large, a screw hole (screw threading portion), formed in the fastening portion of the shade 6 for the bracket, and the positioning projection are plastically deformed (buckled). As a result, there have been encountered new problems that the satisfactory positional accuracy of the light distribution control members (the lens 4 and the shade 6) relative to the bracket 1 is not obtained (that is, the optical axes of the light source units are not properly arranged) and that the screw threading portion is plastically deformed (that is, becomes loosened) by a creep phenomenon in an environment in which a change in the ambient temperature is large, so that the optical axis deviates from a proper direction.

Therefore, the inventor of the present invention considered that the plastic deformation (buckling and looseness) of the fastening portion (the screw threading portion and the positioning projection) of the shade for the bracket is attributable to the fact that the screw threading portion and the positioning projection can not withstand the fastening force because they are made of the resin. The inventor further considered that when the screw threading portion and the positioning projection are made of metal and are integrally formed with the resin shade, the fastening portion (the screw threading portion and the positioning projection) will not be subjected to plastic deformation, thus securing the positional accuracy of the light distribution control members relative to the bracket, and that the positional accuracy between the lens and the shade (which are the light distribution control members) will not be affected since that portion of the shade which is connected to the lens is made of the resin. Therefore, the inventor has constructed an experimental shade, has reviewed advantageous effects of this shade, and has confirmed that this shade is effective. Therefore, the present application has been filed.

SUMMARY OF THE INVENTION

One aspect of the invention is a vehicle headlamp of the including a plurality of light source units, each unit having a light-emitting element as a light source, being mounted on a single metal bracket, and being disposed within a lamp chamber. Irradiation light patterns of the light source units are combined together to form a predetermined light distribution pattern. Each of the light source units comprises at least a cut-off line-forming shade, which is fastened to the bracket by a fastening portion disposed forward of the light-emitting element, and a resin lens, which is connected to the shade and is disposed forward of the shade. At least a part of the fastening portion of the shade is made of metal.

Here, the "light-emitting element" means an element-like light source having a dot-like light-emitting portion. The "light-emitting element" is not particularly limited to any specific kind, and for example, a light-emitting diode or a laser diode can be used.

The "metal bracket" may be of any type, such as, for example, a product formed by pressing, a product formed by cutting and a diecast product as long as the bracket is made of metal. However, in view of thermal conductivity, a light-weight property and processability, an aluminum diecast product is most preferred.

In the vehicle headlamp of the invention, the fastening portion of the shade for the bracket may include a positioning projection for the bracket and a screw threading portion into which a metal fastening screw is threaded, wherein at least the screw threading portion is made of metal.

In the vehicle headlamp of the invention, the shade may be formed into an integrally-molded resin body in which the metal member is insert molded.

In the vehicle headlamp of the invention, each of the light source units can be a projection-type light irradiation unit comprising the light-emitting element, a reflector, the shade, and a projection lens serving as the resin lens, wherein the light source units are fixed to the bracket in such a manner that cut-off lines of the irradiation light patterns of the light source units are superposed together.

BRIEF DESCRIPTION OF THE DRAWINGS

The advantages, nature, and various additional features of the invention will appear more fully upon consideration of the exemplary embodiments. The exemplary embodiments are set forth in the following drawings.

FIG. 7A is the front perspective view, and FIG. 7B is the rear perspective view.

DESCRIPTION OF THE EXEMPLARY EMBODIMENTS

Although the invention will be described with respect to an exemplary embodiments thereof, the following exemplary embodiments do not limit the invention.

Figure 1:
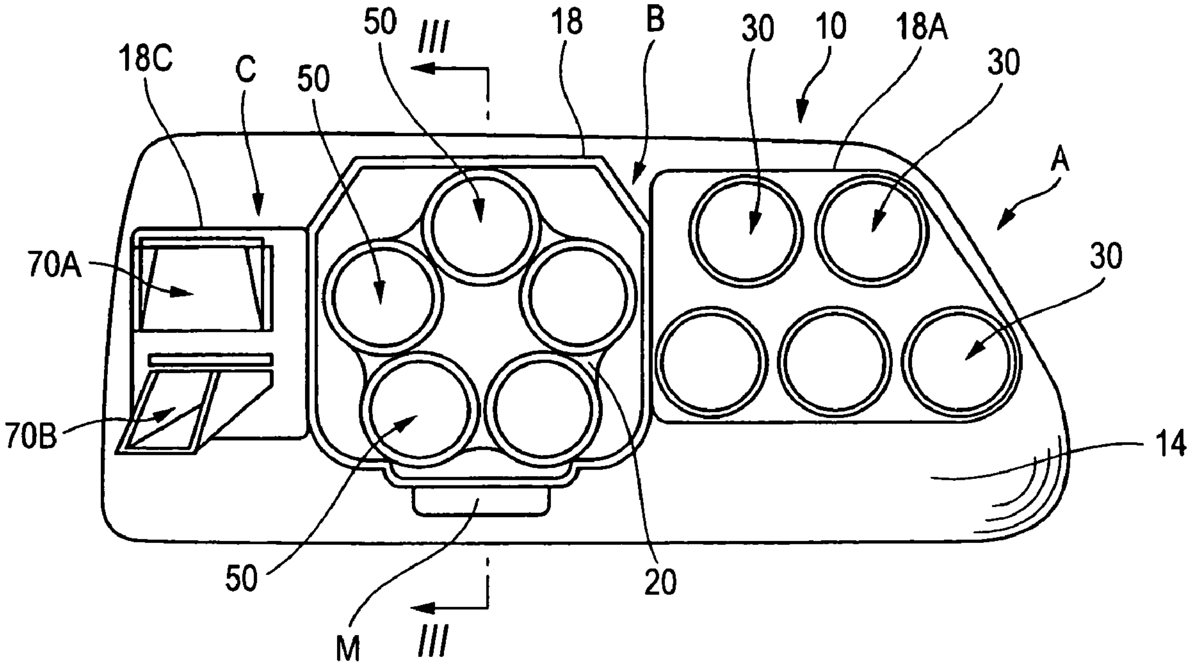
FIG. 1 is a front-elevational view of one exemplary embodiment of an automotive headlamp of the present invention.
Figure 2:
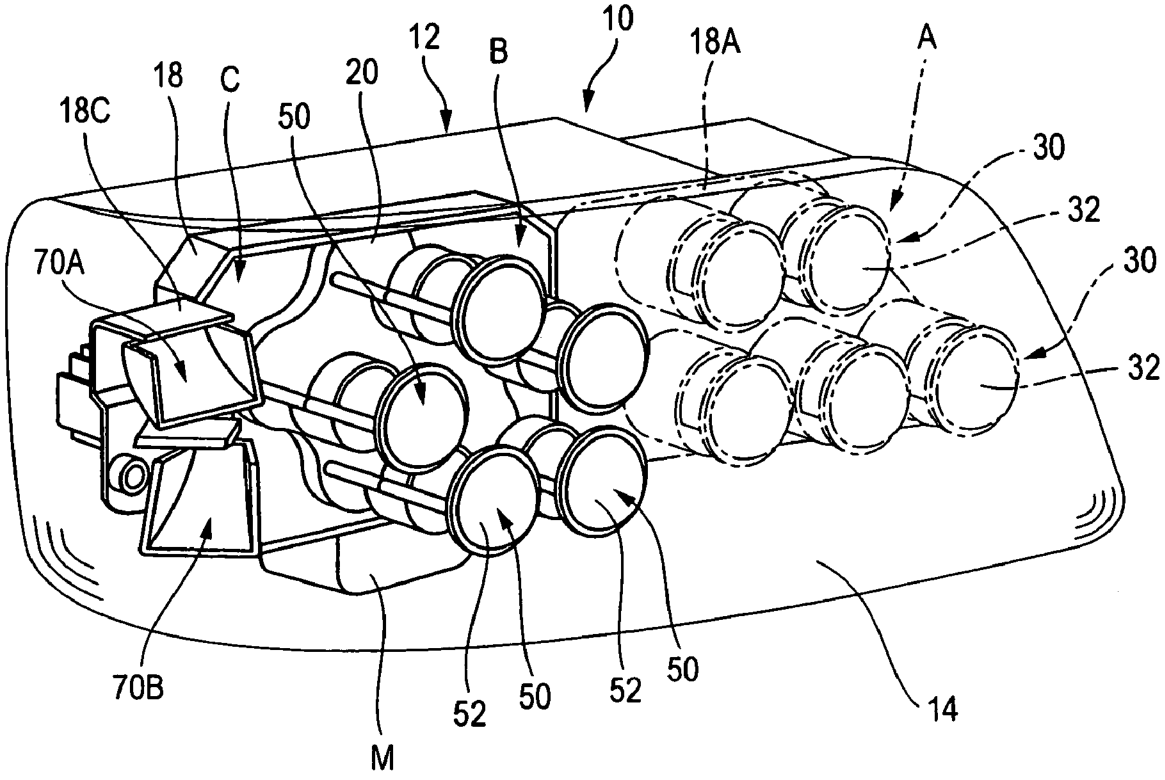
FIG. 2 is a perspective view of the headlamp.
Figure 3:
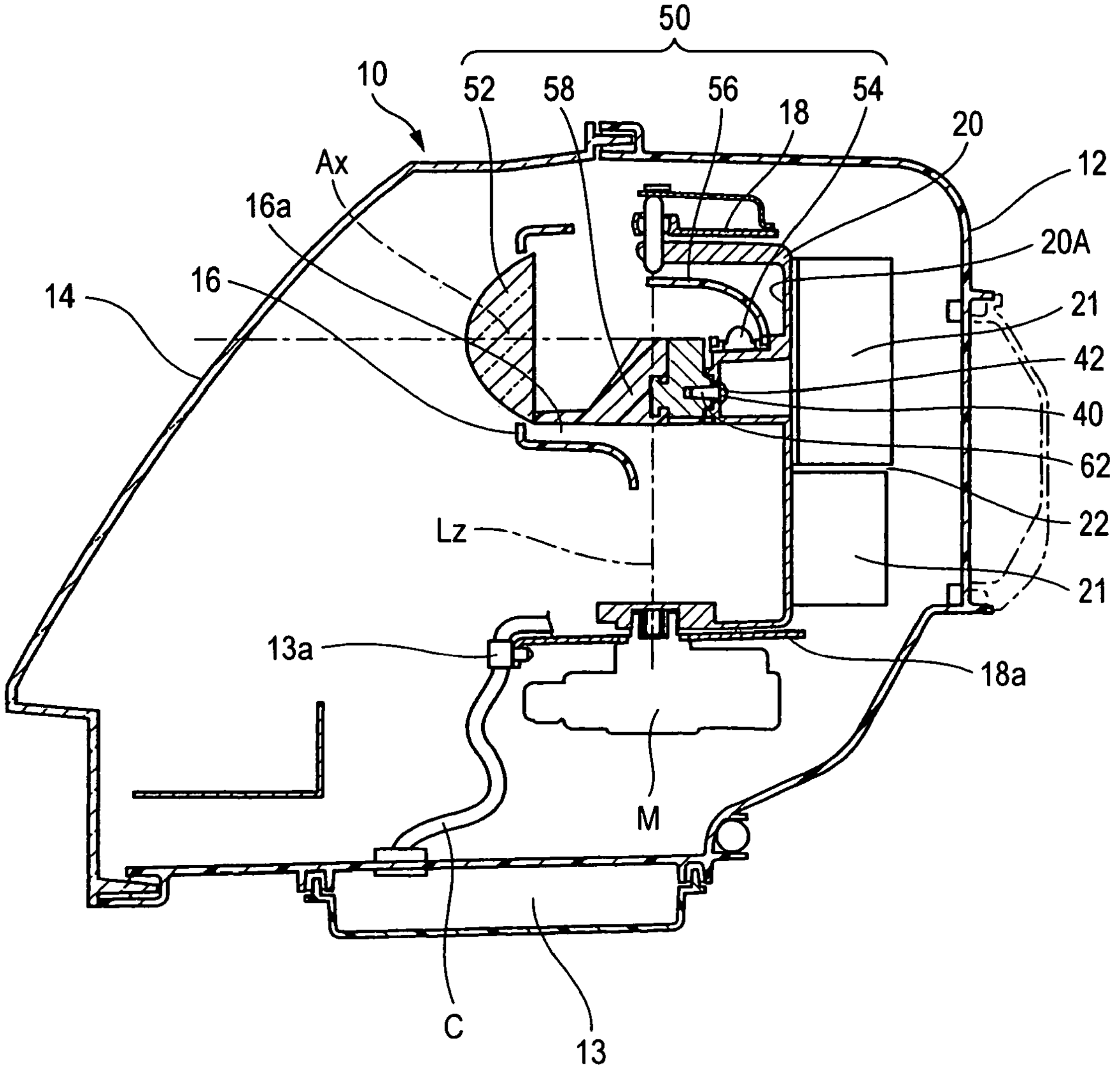
FIG. 3 is a vertical cross-sectional view of the headlamp taken along the line III-III of FIG. 1.
Figure 4:
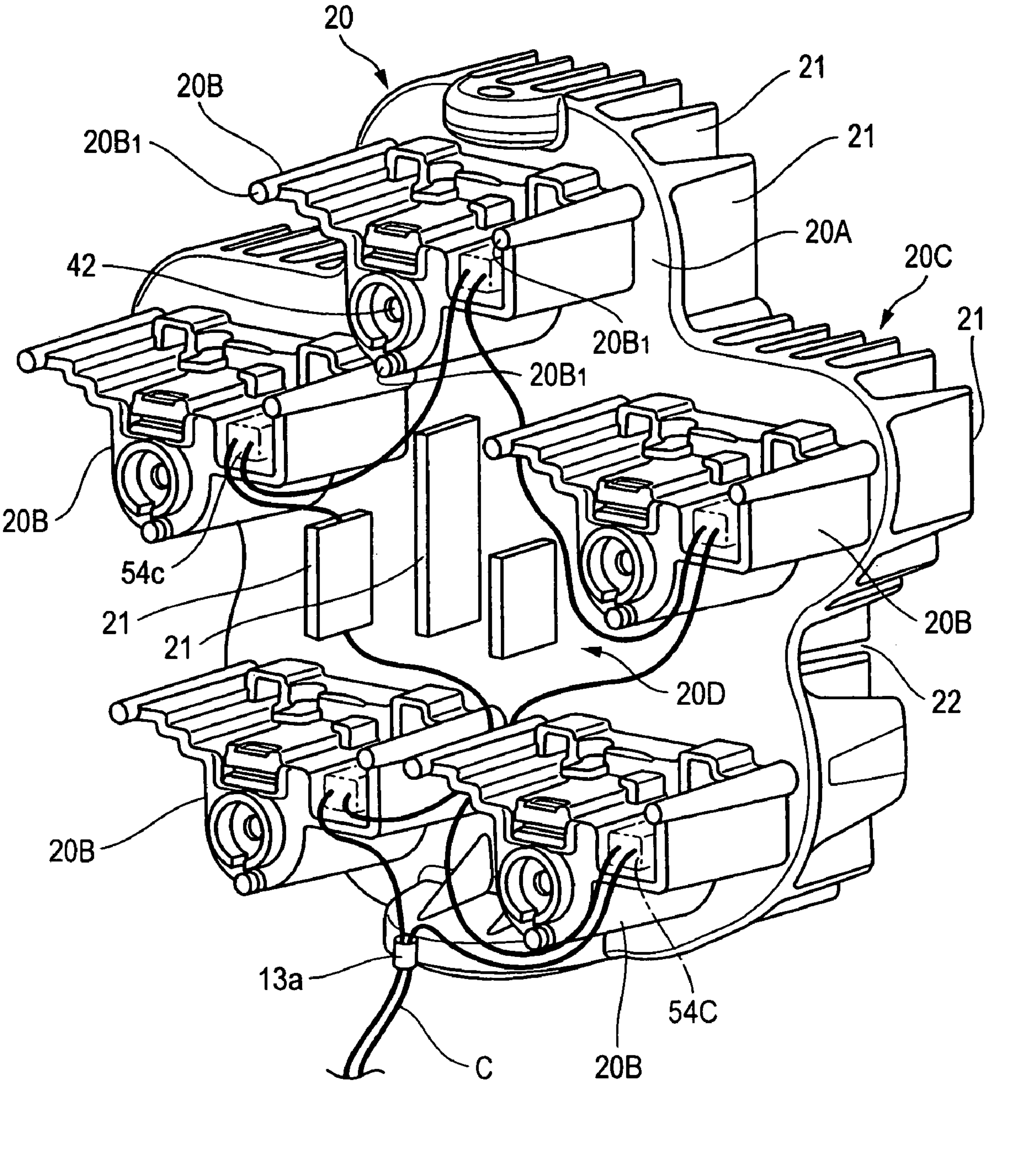
FIG. 4 is a front perspective view of a metal bracket.
Figure 5:
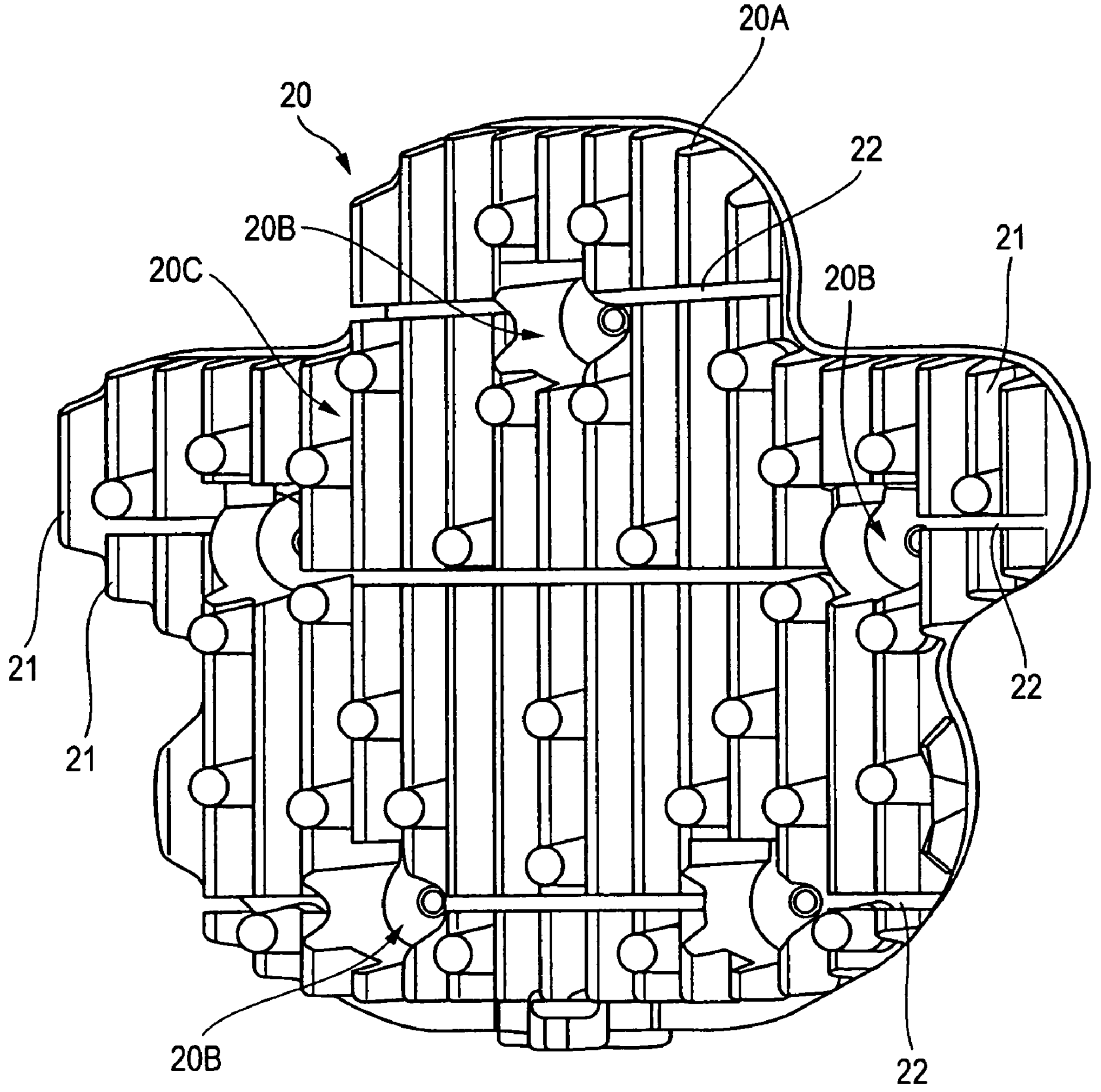
FIG. 5 a rear perspective view of the metal bracket.
Figure 6:
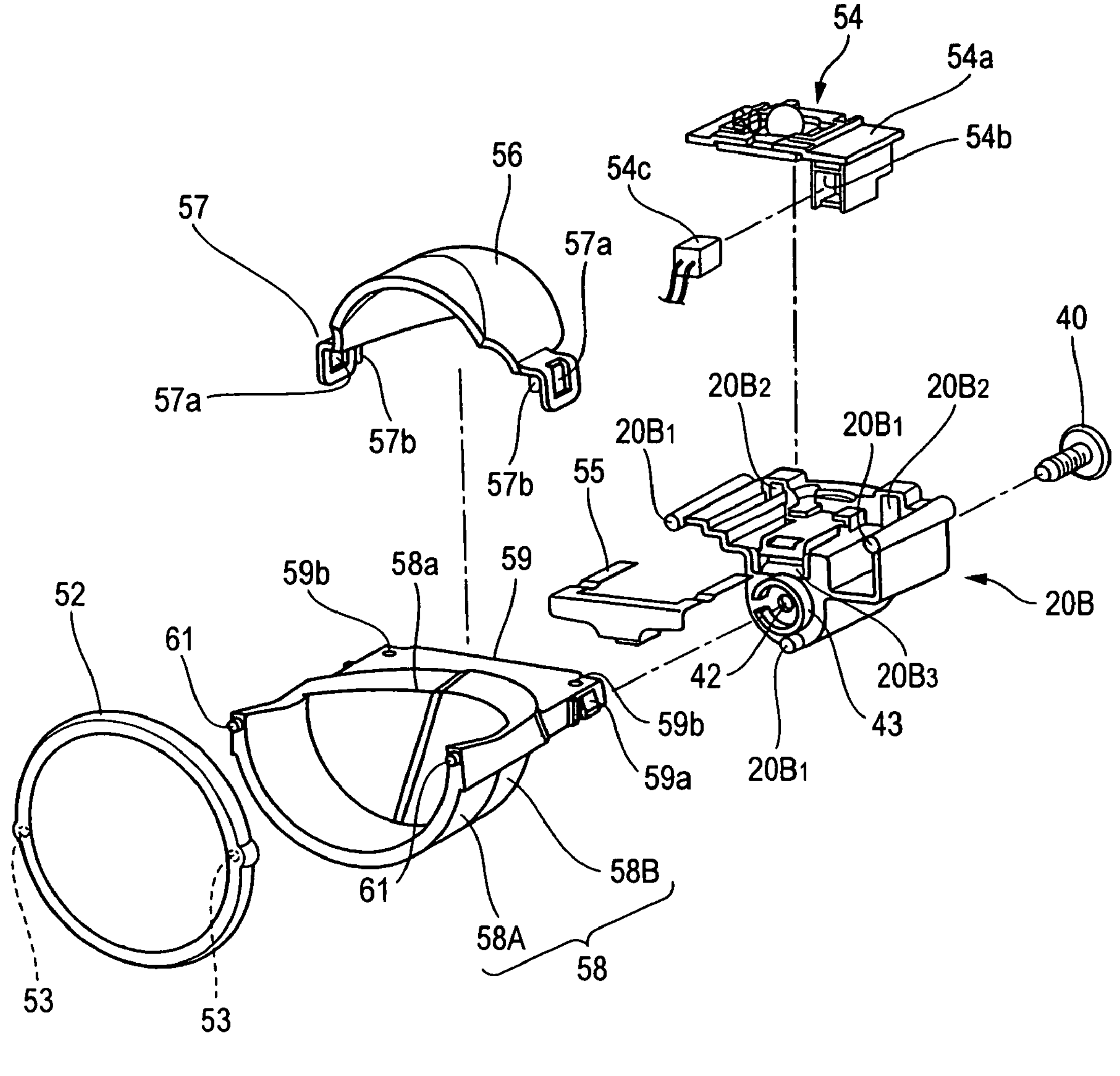
FIG. 6 is an exploded, perspective view of a light source unit of a low-beam lamp.
Figure 7:
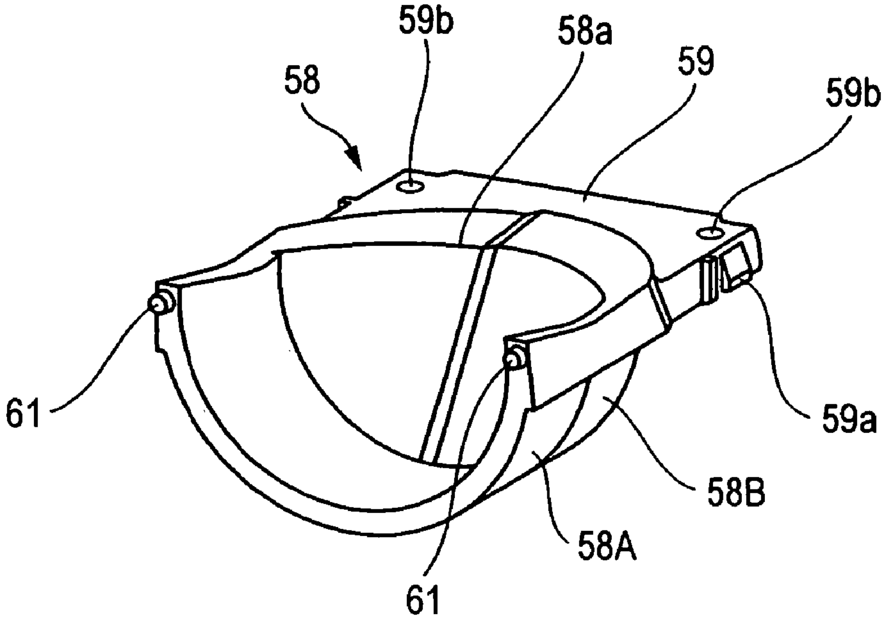
FIGS. 7A and 7B are perspective views of a shade which is an important portion of the light source unit of the low-beam lamp.
Figure 7:
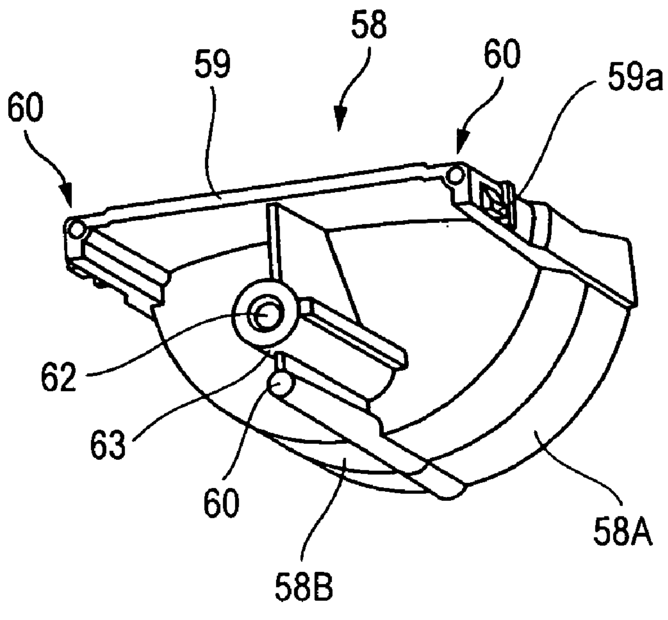
Figure 8:
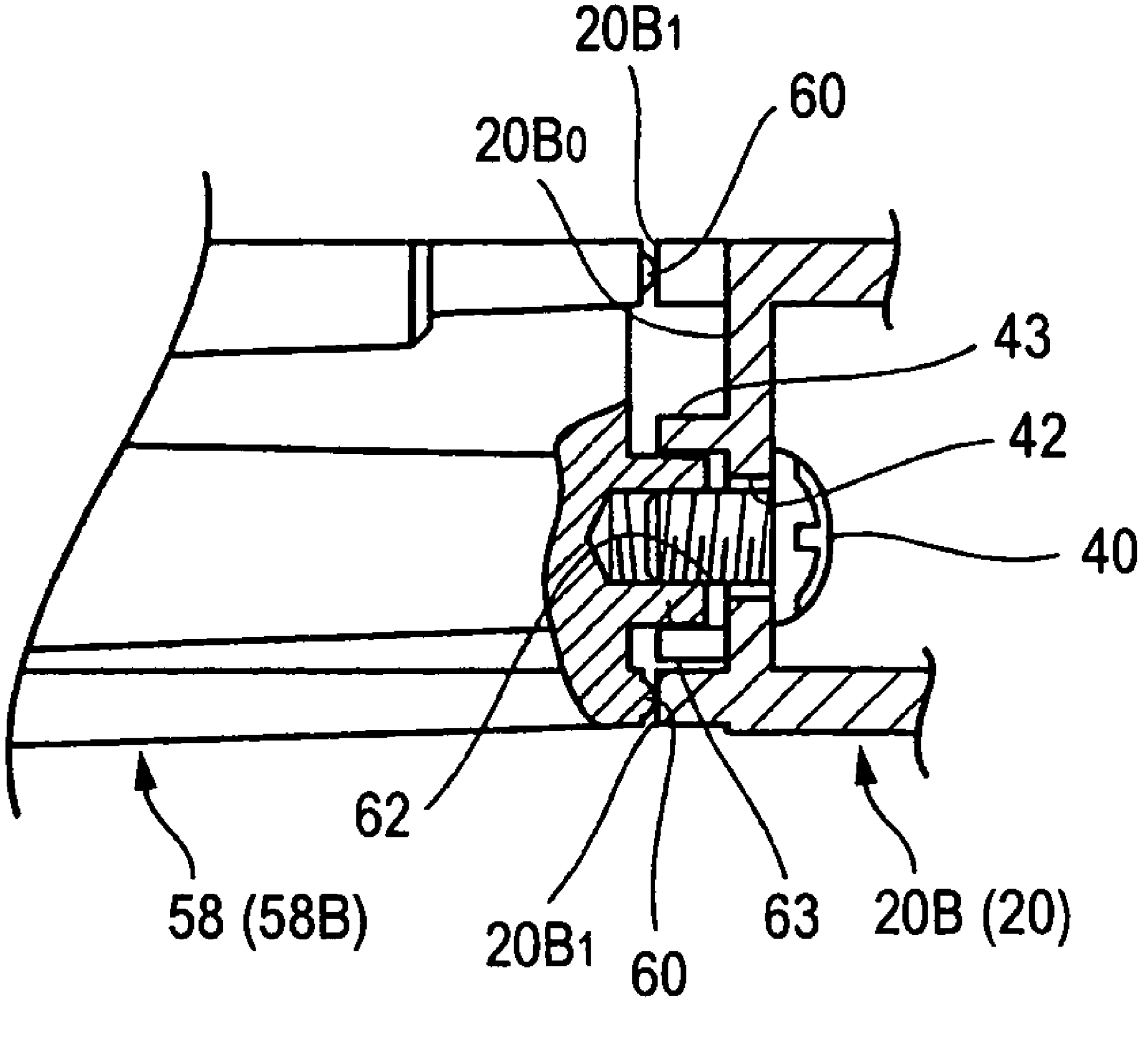
FIG. 8 is a vertical cross-sectional view showing a fastening portion of the shade fastened to the bracket.
Figure 9:
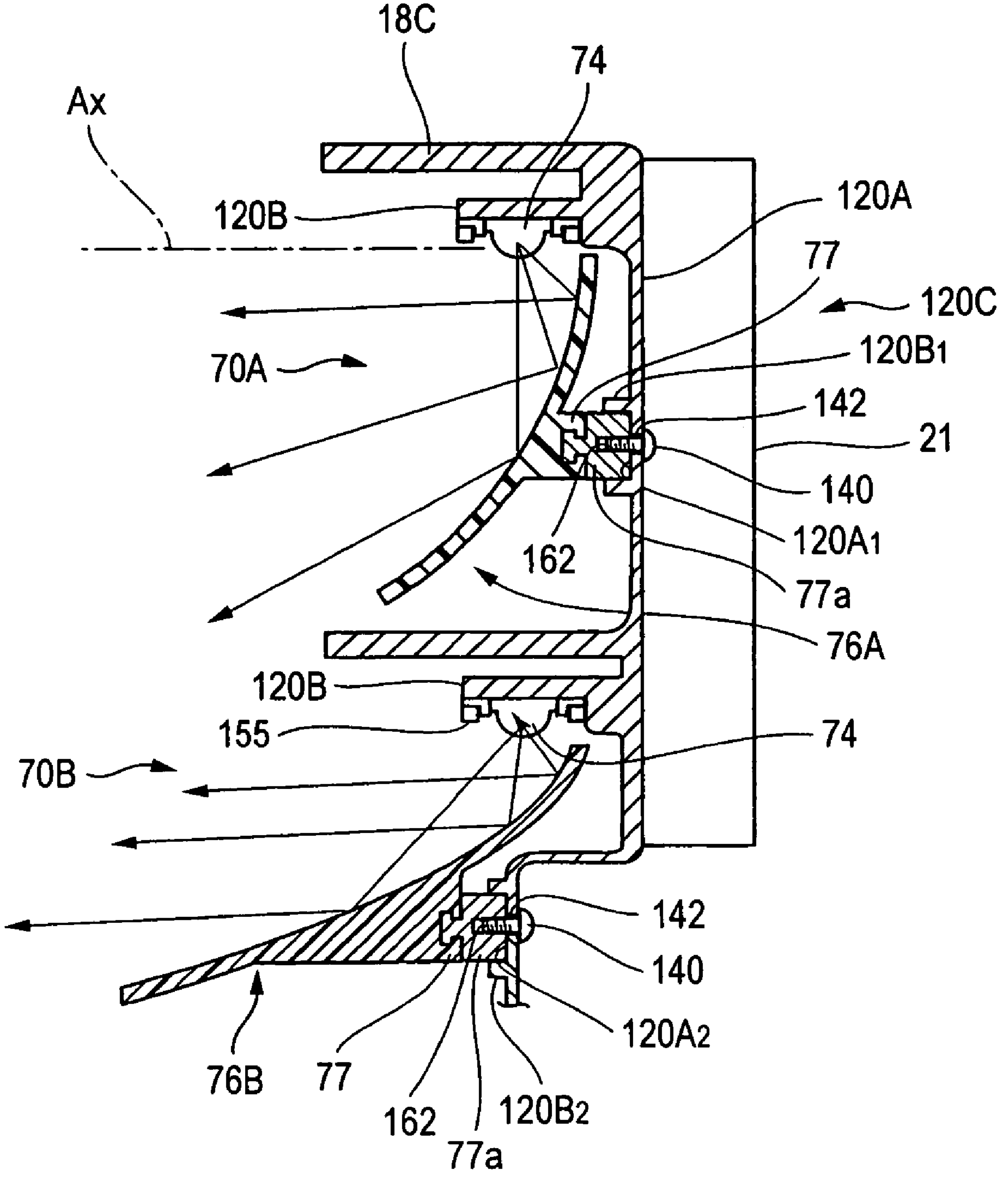
FIG. 9 is a vertical cross-sectional view showing light source units of a bending lamp.
Figure 10:
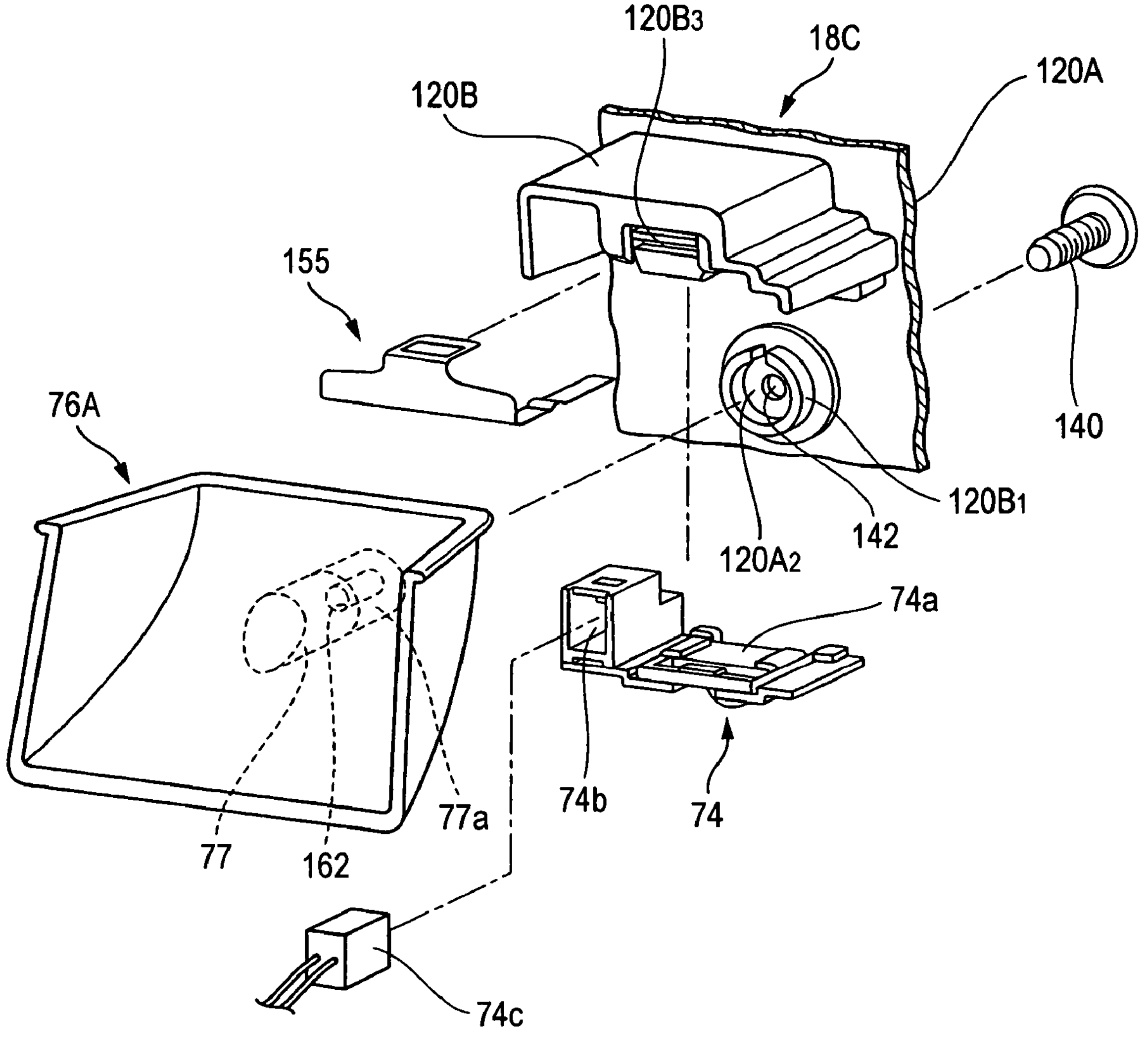
FIG. 10 is an exploded, perspective view of the upper light source unit of the bending lamp.

FIGS. 1 to 10 show one exemplary embodiment of an automotive headlamp of the invention. FIG. 1 is a front-elevational view of the headlamp, FIG. 2 is a perspective view of the headlamp, FIG. 3 is a vertical cross-sectional view of the headlamp taken along the line III-III of FIG. 1, FIG. 4 is a front perspective view of a metal bracket, FIG. 5 a rear perspective view of the metal bracket, FIG. 6 is an exploded, perspective view of a light source unit of a low-beam lamp, FIGS. 7A and 7B are perspective views of a shade which is an important portion of the light source unit of the low-beam lamp (FIG. 7A is the front perspective view, and FIG. 7B is the rear perspective view), FIG. 8 is a vertical cross-sectional view showing a fastening portion of the shade for the bracket, FIG. 9 is a vertical cross-sectional view of light source units forming a bending lamp, and FIG. 10 is an exploded, perspective view of the upper light source unit of the bending lamp.

In these Figures, the vehicle headlamp 10 is a lamp that is adapted to be mounted on a right side portion (when viewed from a driver's seat) of a front end portion of a vehicle, and this vehicle headlamp has a lamp chamber formed by a lamp body 12 and a transparent light-transmitting cover 14 attached to a front end opening portion of the lamp body 12. A high-beam lamp A, a low-beam lamp B and a bending lamp C are provided within this lamp chamber and are arranged in this sequence outward in a direction of a width of the vehicle. The high-beam lamp A comprises a total of five light source units 30 (each having a light-emitting element, not shown, as a light source) arranged in two (upper and lower) rows, and irradiation light patterns of these light source units 30 are combined together to form a high-beam light distribution pattern. The low-beam lamp B comprises a total of five light source units 50 (each having a light-emitting element 54 as a light source) arranged in an annular form, and irradiation light patterns of these light source units 50 are combined together to form a low-beam light distribution pattern. The bending lamp C comprises two light source units 70 (70A and 70B) (each having a light-emitting element 74 as a light source) arranged in an upward-downward direction, and irradiation light patterns of these light source units 70 are combined together to form a shoulder-beam light distribution pattern.

An inner panel 16 (see FIG. 3) called a bezel is provided within the lamp chamber generally along the light-transmitting cover 14, and tubular open portions 16*a* are formed respectively through those portions of the inner panel 16 corresponding respectively to the light source units 30, 50 and 70 and the tubular open portions 16*a* generally surround these light source units 30, 50 and 70, respectively.

Each light source unit 30 of the high-beam lamp A and each light source unit 50 of the low-beam lamp B are projection-type light irradiation units, respectively, which have projection lens 32 and 52 provided respectively at front ends thereof. The two light source units 70 (the upper light source unit 70A and the lower light source unit 70B) of the bending lamp C are reflection-type light irradiation units, respectively.

The light source units 50 of the low-beam lamp B are integrally mounted on the aluminum-diecast low-beam lamp bracket 20. This low-beam lamp bracket 20 is supported on an aluminum-diecast lamp housing 18 of a rectangular frame-like shape, which can be turned horizontally. The lamp housing 18 is composed of an aluminum-diecast product of an integral construction. The lamp housing 18 has a lamp bracket 18A of the high-beam lamp A formed integrally at one side thereof and a lamp bracket 18C of the bending lamp C formed integrally respectively at another side thereof. This lamp housing 18 is supported by an aiming mechanism (which is not shown and includes aiming screws and a pivot support point) that allows the lamp housing 18 to be tilted relative to the lamp body 12 in the upward-downward direction and the left-right direction.

A swivel motor M is mounted at a lower wall 18*a* of the lamp housing 18, and an output shaft of the swivel motor M is connected to a lower portion of the low-beam lamp bracket 20 so that the low-beam lamp B (the low-beam lamp bracket 20 having the light source units 50 integrally mounted thereon) can be swiveled about a swivel axis (vertical axis) Lz. For example, the driving of the motor M is controlled in accordance with a steering angle of a steering wheel by a motor drive control circuit (not shown), and the direction of an optical axis of the low beam lamp B (that is, the beam-irradiating direction of the low-beam lamp B) is changed horizontally in accordance with the steering angle of the steering wheel so that good visibility can be obtained when the vehicle advances on a curved road.

The aluminum-diecast high-beam lamp bracket 18A (having the light source units 30 integrally mounted thereon) and the aluminum-diecast bending lamp bracket 18C (having the light source units 70 integrally mounted thereon) are formed integrally respectively at the sides of the housing 18, which rotatably supports the low-beam lamp bracket 20 having the light source units 50 integrally mounted thereon.

As shown in FIGS. 3 and 4, the low-beam lamp bracket 20 includes a vertical panel portion 20A; shelf-like unit mounting portions 20B extending forwardly respectively from five portions of the vertical panel portion 20A, which are spaced equally from one another in a peripheral direction; and heat sink portions 20C and 20D formed respectively on rear and front surfaces of the vertical panel portion 20A. The heat sink portion 20C are formed by a plurality of vertically-extending radiation fins 21 formed on the rear surface, while the heat sink portion 20D is formed by a plurality of vertically-extending radiation fins 21 formed on the front surface. Further, heat sink portions 120C (see FIG. 9), each formed by a plurality of radiation fins 21, are formed respectively on the high-beam lamp bracket 18A and the bending lamp bracket 18C. Here, a heat sink portion (formed by the radiation fins) formed on a rear surface of the high-beam lamp bracket 18*a* is omitted from the figures.

Namely, the light-emitting elements 34, 54 and 74 of the light source units 30, 50 and 70 are formed respectively as LED assemblies (see FIGS. 6 and 10) each having a while-light emitting diode received within a synthetic resin assembly casing, and each of the light-emitting elements 34, 54 and 74, when turned on, generates heat. However, the light-emitting elements 34, 54 and 74 are mounted respectively on the brackets 18A, 20 and 18C composed respectively of the aluminum-diecast products, and therefore heat, generated in the light-emitting elements 34, 54 and 74, can be quickly moved to the respective brackets 18A, 20 and 18C, which have a larger heat capacity, by a heat conduction effect. Besides, the radiation of the heat to an internal space of the lamp chamber is promoted by the radiation fins 21, so that a temperature rise of the light-emitting elements 34, 54 and 74 can be suppressed. As a result, the reduction of the intensity of the light source beams of the light-emitting elements 34, 54 and 74 and a change in the luminescent color can be effectively suppressed.

As shown in FIG. 5, slits 22 are formed respectively in predetermined portions of the heat sink portion 20C formed on the low-beam lamp bracket 20. The slits 22 are spaced from one another in the longitudinal direction of the radiation fins 21. With this construction, when the low-beam lamp B (the low-beam lamp bracket 20 having the light source units 50 integrally mounted thereon) is swiveled about the swivel axis Lz, fresh air is introduced between the adjacent radiation fins 21 and 21 through the slits 22, thereby enhancing the radiation effect of the heat sink portion 20C.

With respect to the light-emitting elements 54 and 74, power supply connectors 54*c* and 74*c* can be inserted into and removed from respective connector insertion ports 54*b* and 74*b*, which are open to the front sides of the LED assembly casings 54*a* and 74*a*, from the front sides of the respective brackets 20A and 18C. (Although not shown, connection of a power supply cord to the light-emitting element 34 can be made in a similar manner.) A lighting circuit unit 13, in which circuits for controlling the lighting of the light-emitting elements 34, 54 and 74 of the lamps A, B and C are received in an integrated manner, is provided at the lower surface of the lamp body 12. Cords C extend from the lighting circuit unit 13 (see FIG. 3) into the lamp chamber and further extend to the respective light-emitting elements 34, 54 and 74 of the lamps A, B and C. Particularly, the cord C, extending to the light-emitting elements 54 of the low-beam lamp B, is supported by a cord clamp 13*a* mounted on that portion of the lower wall 18*a* of the housing 18 disposed in the vicinity of the swivel axis Lz. Therefore, there is no anxiety that this cord C interferes with other members when the low-beam lamp B (the low-beam lamp bracket 20 having the light source units 50 integrally mounted thereon) swivels.

Next, the specific construction of the light source unit 50 will be described.

As shown in FIGS. 3, 6, 7 and 8, the light source units 50 are fixed to the unit mounting portions 20B, respectively, and each light source unit 50 comprises the projection lens 52 (light distribution control member) disposed on an optical axis Ax, the upwardly-directed light-emitting element 54 (white-light emitting diode, which serves as the light source) provided rearwardly of the projection lens 52, a reflector 56 (light distribution control member) disposed to cover the upper side of the light-emitting element 54, and the resin, cut-off line-forming shade 58 (light distribution control member) provided between the light-emitting element 54 and the projection lens 52, part of the shade 58 being formed of metal.

A front-edge step portion 58*a* for forming a cut-off line is formed at an upper surface of the shade 58, as shown in FIG. 7A. As shown in FIG. 7B, two positioning projections 60 are formed respectively on left and right side portions of the rear side of the shade 58, and further one positioning projection 60 is formed on a lower portion of a widthwise-central portion of this rear side. Thus, three positioning projections 60 are provided. A boss 63 with an internally-threaded portion 62 is formed on and projects from the rear side of the shade 58. The boss 63 is disposed at a generally central portion with respect to the three positioning projections 60. On the other hand, a screw passage hole 42 and a boss engagement portion 43 of a cylindrical shape, surrounding this hole 42, are provided at a vertical front end surface 20B0 of the unit mounting portion 20B. As shown in FIGS. 6 and 8, the boss 63 is engaged in the boss engagement portion 43, and a fastening screw 40, passed through the hole 42 from the rear side of the unit mounting portion 20B, is threaded into the internally-threaded portion 62. By this engagement, the shade 58 is fastened to the unit mounting portion 20B in such a manner that the three positioning projections 60 on the rear side of the shade 58 are pressed respectively against three vertical front end abutment surfaces 20B1 of the unit mounting portion 20B, with the optical axis Ax of the light source unit 50 disposed perpendicular to the vertical front end abutment surfaces 20B1 (the vertical panel portion 20A).

As shown in FIGS. 6, 7A and 7B, generally-rectangular hooks 59*a* are formed respectively at left and right outer surfaces of a rearwardly-extending portion 59 formed at the upper portion of the shade 58, and generally rectangular opening portions 57*a*, formed respectively in a pair of left and right legs 57 of the reflector 57, can be brought into concave-convex lance engagement respectively with these hooks 59*a*. Engagement recesses 59*b* are formed in an upper surface of the rearwardly-extending portion 59 of the shade 58 and are disposed near respectively to the hooks 59*a*. These engagement recesses 59*b* correspond respectively to engagement projections 57*b* formed on a lower surface of the reflector 56 and disposed near respectively to the opening portions 57*a*. The peripheral lower end of the reflector 56 is brought into abutting engagement with the upper surface of the rearwardly-extending portion 59 of the shade 58, which is mounted on (that is, screw-fastened to) the unit mounting portion 20B. Therefore, the engagement projections 57*b* are engaged respectively in the engagement recesses 59*b*, and the opening portions 57*a* of the legs 57 are held in concave-convex lance engagement with the hooks 59*a* of the shade 58, respectively. By this engagement, the reflector 56 is held in a fixed condition with good positional accuracy and covers the upper side of the light-emitting element 54 mounted on the upper surface of the unit mounting portion 20B (see FIG. 3) A leaf spring member 55 fixedly holds the light-emitting element 54 received in the upper surface of the unit mounting portion 20B.

As shown in FIGS. 6 and 7A, the shade 58 has a pair of left and right engagement projections 61 formed on a semi-circular or arcuate front edge thereof. Engagement recesses 53 (see FIG. 6), corresponding respectively to the engagement projections 61 of the shade 58, are formed on a rear surface of a peripheral edge portion of the projection lens 52. The engagement projections 61 are engaged respectively in the engagement recesses 53, thereby accurately positioning the projection lens 52 and the shade 58 relative to each other.

The projection lens 52 is composed of a molded product made, for example, of an acrylic resin. On the other hand, with respect to the shade 58, its front end portion 58A, to which the lens 52 is connected, is made of a polycarbonate resin, and its rear end portion 58B (including the rearwardly-extending portion 59, and the internally-threaded portion 62), which serves as the fastening portion for the bracket 20, is made of metal. The projection lens 52 and the shade 58 can be integrally connected together with good positional accuracy by adhesive bonding or welding. Besides, by increasing the strength of fastening between the shade 58 and the metal bracket 20, the positional accuracy of the lens 52 and the shade 58 (which are the light distribution control members) relative to the bracket 20 can be secured.

The shade rear end portion 58B is used for fastening the shade 58 to the bracket 20 (the unit mounting portion 20B) and includes the internally-threaded portion 62. The rearwardly-extending portion 59 (including the positioning projections 60) of the shade 58 is composed of an aluminum-diecast product. The shade rear end portion 58B (an aluminum-diecast product) is formed integrally with the polycarbonate resin shade front end portion 58A by insert molding.

The shade 58, integrally connected to the lens 52, is screw-fastened to the bracket 20 (the vertical front end surface 20B0 of the unit mounting portion 20B) by the fastening screw 40, as shown in FIG. 8. Here, when the force of fastening between the shade 58 and the bracket 20 by the fastening screw 40 is increased in order to enhance the positional accuracy of the lens 52 and the shade 58 (which are the light distribution control members) relative to the bracket 20, a fastening force (load), acting on the fastening portion (the positioning projections 60 and the internally-threaded portion 62) of the shade 58 for the bracket 20, increases. If this fastening portion (the positioning projections and the screw-threading portion) of the shade is made of a resin, as in the conventional technique, there is a concern that the positioning projections and the screw-threading portion of the fastening portion are subjected to plastic buckling deformation and that the screw threading portion of the fastening portion is plastically deformed so that it is loosened by a creep phenomenon in an environment in which a change in the ambient temperature is large. In this exemplary embodiment, however, the fastening portion (the shade rear end portion 58B including the positioning projections 60 and the internally-threaded portion 62) of the shade 58 is made of metal. This fastening portion is composed of the aluminum-diecast product formed integrally with the shade body made of the polycarbonate resin. Therefore, the fastening portion will be not subjected to plastic deformation (such as buckling and looseness), so that the shade 58 and the bracket 20 are kept in such a condition that the high fastening force acts therebetween. Therefore, by increasing the force of fastening between the shade 58 and the bracket 20 by the fastening screw 40, the positional accuracy of the light distribution control members (the lens 52 and the shade 58) relative to the bracket 20 can be secured.

Therefore, in this exemplary embodiment, when the optical axes Ax of all of the light source units 50 are properly arranged, the cut-off lines of these light source units 50 are accurately superposed together, thereby forming the optimum light distribution pattern as a low beam that has a clear cut-off line and provides good visibility.

Next, the specific construction of the light source unit 70 of the bending lamp C will be described.

Details of the light source unit 70 are shown in FIGS. 9 and 10. The bending lamp bracket 18C on which the light source units 70 are mounted includes a vertical panel portion 120A, two shelf-like unit-mounting portions 120B extending forwardly respectively from upper and lower portions of the vertical panel portion 120A, and a heat sink portion 120C comprising a plurality of vertically-extending radiation fins 21 formed on a rear surface of the vertical panel portion 120A.

Each of the light source units 70 (70A and 70B) comprises the downwardly-directed light-emitting element 74 (white light-emitting diode, which serves as the light source) mounted on the unit mounting portion 120B, and a resin reflector 76A, 76B (light distribution control member) of a generally parabolic cylinder-shape, which is screw-fastened to the vertical panel portion 120A and is disposed below the light-emitting element 74. A leaf spring member, which is inserted in a slit 120B formed in the unit mounting portion 120B, fixedly holds the light-emitting element 74 received in a lower surface of the unit mounting portion 120B.

A cylindrical boss 77 projects from a generally central portion of a rear surface of the resin reflector 76A, 76B of each light source unit 70A, 70B, and a metal boss distal end portion 77*a* of a cylindrical shape, having an internally-threaded portion 162, is formed integrally with a distal end portion of the boss 77 by insert molding. On the other hand, reflector mounting surfaces 120A1 and 120A2, inclined relative to the vertical panel portion 120A at a predetermined angle outwardly in the direction of the width of the vehicle, are formed on the vertical panel portion 120A and are disposed below the unit mounting portions 120B, respectively. Cylindrical boss engagement portions 120B1 and 120B2 are formed on the vertical panel portion 120A in surrounding relation respectively to the reflector mounting surfaces 120A1 and 120A2 and are disposed perpendicular to the reflector mounting surfaces 120A1 and 120A2, respectively.

A screw passage hole 142 is formed through each of the reflector mounting surfaces 120A1 and 120A2. When a fastening screw 140, passed through each screw passage hole 142 from the rear side of the vertical panel portion 120A, is threaded into the corresponding the internally-threaded portion 162, an end surface of the boss distal end portion 77*a*, engaged in the boss engagement portion 120B1, 120B2, is pressed and held against the reflector mounting surface 120A1, 120A2. Therefore, the reflectors 70 are fastened to the respective reflector mounting surfaces in such a manner that optical axes Ax of the light source units 70 are inclined relative to the vertical panel portion 120A at respective predetermined angles outwardly in the direction of the width of the vehicle.

In the lower light source unit 70B, the reflector 76B of a generally parabolic cylinder-shape extends considerably forward in such a manner that a solid angle increases. Part of the vertical panel portion 120B2 bulges forward, and the reflector mounting surface 120A2 is formed at a front end of this bulged portion. The reflector mounting surface 120A2 (and the boss engagement portion 120B2 to which the boss 77 is engaged) is inclined outwardly in the direction of the width of the vehicle at a larger angle than the reflector mounting surface 120A1 (and the boss engagement portion 120B1) of the upper light source unit 70A. That is, as shown in FIG. 2, the lower light source unit 70B is inclined outwardly in the direction of the width of the vehicle at a larger angle than the upper light source unit 70A. Therefore, the upper light source unit 70A forms a light distribution pattern illuminating a wide area disposed obliquely forward of the vehicle, while the lower light source unit 70B forms a light distribution pattern illuminating a limited range of an area disposed more obliquely forward of the vehicle.

The light source unit 30 of the high-beam lamp A comprises the projection lens 32 (light distribution control member) disposed on an optical axis Ax, the upwardly-directed light-emitting element 34 (white-light emitting diode, which serves as the light source) mounted on a unit mounting portion formed on the bracket 18A, a resin reflector 36 (light distribution control member, not shown) disposed to cover the upper side of the light-emitting element 34, and a resin lens holder (not shown) disposed between the light-emitting element 34 and the projection lens 32. Part of this lens holder is made of metal.

With respect to the lens holder of the light source unit 30, a rear end portion of this lens holder, which has an internally-threaded portion and positioning projections, is fastened to a vertical panel portion of the metal bracket 18A by a fastening screw, such a that described above for the shade 58 of the light source unit 50. A front end portion of the lens holder, connected to the projection lens 32 made of an acrylic resin, is made of a polycarbonate resin, and the rear end portion of the lens holder, including a fastening portion (the positioning projections and the internally-threaded portion) for being screw-fastened to the metal bracket 18A, is made of metal (that is, composed of an aluminum-diecast product). The lens holder can be connected to the acrylic resin projection lens with good positional accuracy by adhesive bonding or welding. By increasing the strength of fastening between the lens holder and the metal bracket 18A, the positional accuracy of the projection lens (light distribution control member) relative to the bracket 18A can be assured.

Figure 11:
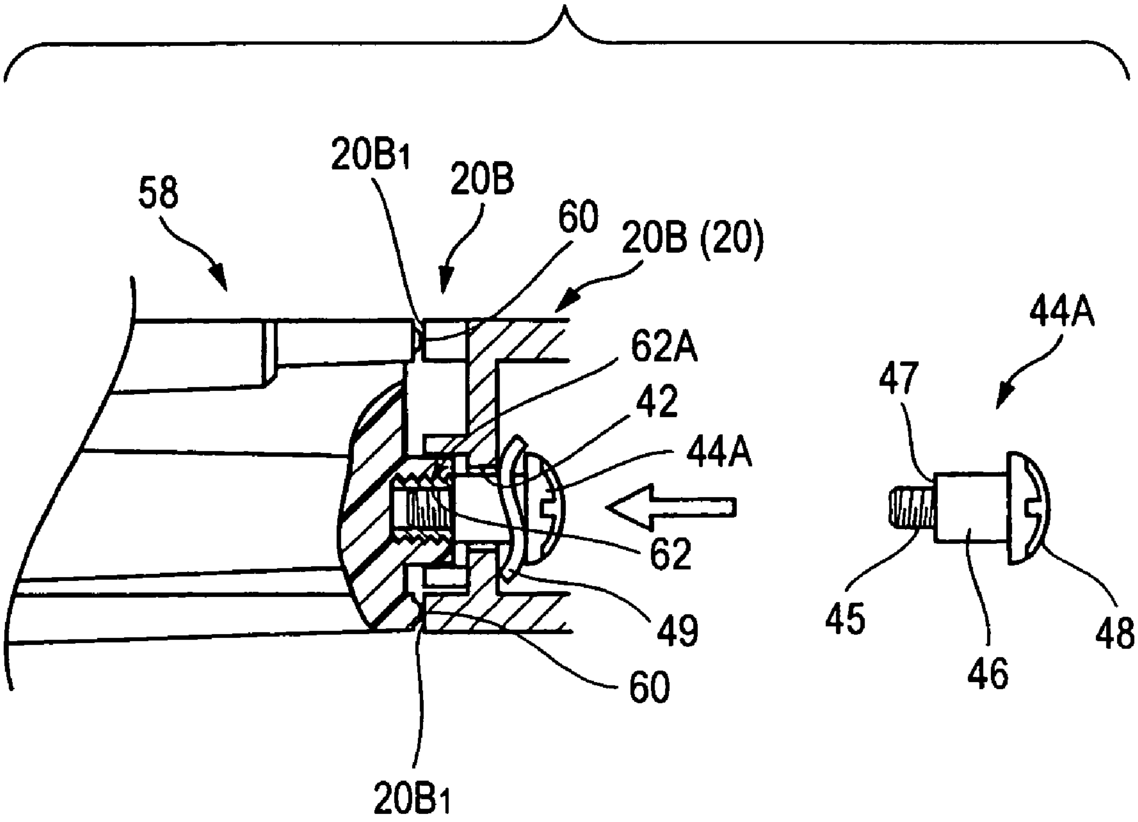
FIG. 11 is a vertical cross-sectional view showing a fastening portion of a shade fastened to a bracket, the shade being an important portion of a light source unit of a low-beam lamp of another embodiment of an automotive headlamp of the invention.
Figure 12:
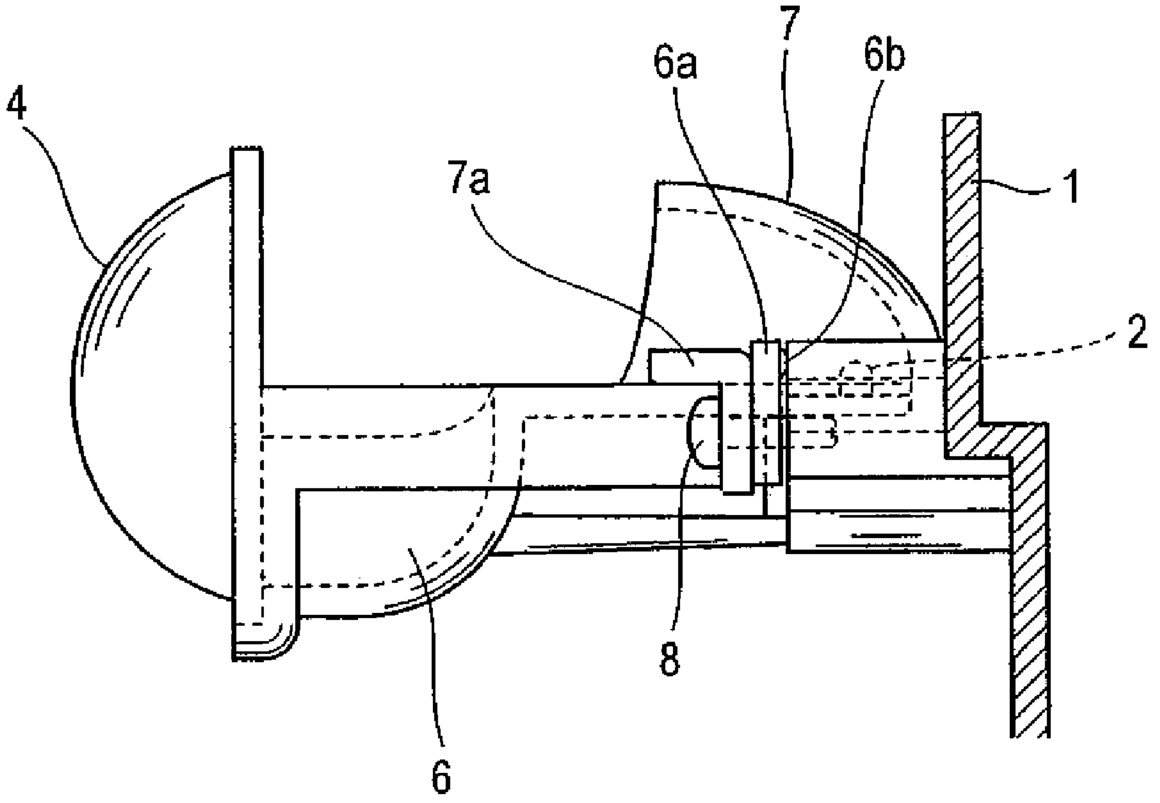
FIG. 12 is a vertical cross-sectional view showing a light source unit of a low-beam lamp of a conventional automotive headlamp.

FIG. 11 is a vertical cross-sectional view showing a fastening portion of a shade fastened to a bracket. The shade is an important portion of a light source unit of a low-beam lamp of another exemplary embodiment of an automotive headlamp of the invention.

In the above first exemplary embodiment, the shade rear end portion 58B, including the internally-threaded portion 62 and the rearwardly-extending portion 59 (the positioning projections 60) that serve as the fastening portion of the shade 58 for the bracket 20 (the unit mounting portion 20B), is composed of an aluminum-diecast product. This second exemplary embodiment differs from the first exemplary embodiment in that only an internally-threaded portion 62 in the shade 58, which is substantially entirely made of a polycarbonate resin, is formed by an insert nut 62A.

Namely, the insert nut 62A, forming the internally-threaded portion 62, is formed integrally in the polycarbonate resin body of the shade 58 by insert molding. Positioning projections 60, serving as a fastening portion of the shade 58 for a bracket 20, are made of the polycarbonate resin.

A fastening screw 44A is a stepped screw in which an externally-threaded portion 45 is formed only at a front end portion, and a proximal end portion 46 of a larger diameter does not include any externally-threaded portion. This fastening screw has a seat surface 47 formed between the externally-threaded portion 45 (front end portion) and the proximal end portion 46. A wavy washer 49 is interposed between a peripheral edge portion of a screw passage hole 42 (formed in a vertical front end surface 20B0 of the unit mounting portion 20B) and a head 48 of the fastening screw 44A. When fixing the shade 58 to the vertical front end surface 20B0 of the unit mounting portion 20B, the positioning projections 60 are brought into abutting engagement with respective vertical front end abutment surfaces 20B1 of the unit mounting portion 20B before the fastening screw (stepped screw) 44A is completely tightened. Therefore, a suitable fastening force (press-contacting force), corresponding to a resilient force of the wavy washer 49, acts between each of the positioning projections 60 and the corresponding vertical abutment surface 20B1. As a result, positional accuracy of the lens 52 and the shade 58 (which are the light distribution control members) relative to the bracket 20 is secured, and the buckling of the positioning projections 60 is prevented.

While the invention has been described with reference to the exemplary embodiments thereof, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

What is claimed is:

1. A vehicle headlamp, comprising:

a metal bracket; and a plurality of light source units, each unit being mounted on said metal bracket and being disposed within a lamp chamber, each unit including a light-emitting element as a light source, wherein irradiation light patterns of said light source units are combined together to form a predetermined light distribution pattern;

a fastening portion;

a cut-off line-forming shade fastened to said metal bracket at the fastening portion, said cut-off line-forming shade serving as a light distribution control member and being disposed forward of said light-emitting element, at least part of said fastening portion being made of metal; and a resin lens serving as a light distribution control member, said resin lens being connected to said shade and being disposed forward of said shade;

wherein said fastening portion includes a positioning projection and a screw threaded portion into which a metal fastening screw is threaded, wherein at least said screw threaded portion is made of metal.

2. The vehicle headlamp according to claim 1, wherein said shade is an integrally-molded resin body including said at least part of said fastening portion being made of metal.

3. The vehicle headlamp according to claim 2, wherein each of said light source units is a projection-type light irradiation unit comprising said light-emitting element, a reflector, said shade, and said resin lens, said resin lens being a projection lens, wherein said light source units are fixed to said bracket in such a manner that cut-off lines of the irradiation light patterns of said light source units are superposed together.

4. The vehicle headlamp according to claim 1, wherein each of said light source units is a projection-type light irradiation unit comprising said light-emitting element, a reflector, said shade, and said resin lens, said resin lens being a projection lens, wherein said light source units are fixed to said bracket in such a manner that cut-off lines of the irradiation light patterns of said light source units are superposed together.

5. The vehicle headlamp according to claim 4, wherein said light emitting elements are light emitting diodes or laser diodes.

6. The vehicle headlamp according to claim 1, wherein said light emitting elements are light emitting diodes or laser diodes.

7. The vehicle headlamp according to claim 1, wherein said metal bracket further comprises an abutment surface and an unit mounting portion, and wherein said positioning projection is brought into contact with said abutment surface by a screw fastened from said unit mounting portion to said screw threaded portion.

8. The vehicle headlamp according to claim 7, wherein said positioning projection is abutted to said abutment surface before said screw is fastened into said screw threaded portion completely.

9. The vehicle headlamp according to claim 8, wherein said shade is an integrally-molded resin body including said at least part of said fastening portion being made of metal.

10. The vehicle headlamp according to claim 8, wherein each of said light source units is a projection-type light irradiation unit comprising said light-emitting element, a reflector, said shade, and said resin lens, said resin lens being a projection lens, wherein said light source units are fixed to said bracket in such a manner that cut-off lines of the irradiation light patterns of said light source units are superposed together.

11. The vehicle headlamp according to claim 8, wherein said light emitting elements are light emitting diodes or laser diodes.

12. A vehicle headlamp, comprising:

a metal bracket; and a plurality of light source units, each unit being mounted on said metal bracket and being disposed within a lamp chamber, each unit including a light-emitting element as a light source, wherein irradiation light patterns of said light source units are combined together to form a predetermined light distribution pattern;

a fastening portion;

a cut-off line-forming shade fastened to said metal bracket at the fastening portion, said cut-off line-forming shade serving as a light distribution control member and being disposed forward of said light-emitting element, at least part of said fastening portion being made of metal; and a resin lens serving as a light distribution control member, said resin lens being connected to said shade and being disposed forward of said shade;

wherein said fastening portion includes a positioning projection and a screw threaded portion into which a metal fastening screw is threaded, wherein at least said screw threaded portion is made of metal, wherein said metal bracket further comprises an abutment surface and an unit mounting portion, and wherein said positioning projection is brought into contact with said abutment surface by a screw fastened from said unit mounting portion to said screw threaded portion, and wherein, when said positioning projection is abutted to said abutment surface, a space is maintained between the metal bracket and a surface of the fastening portion that surrounds the screw threaded portion and that faces the metal bracket.

* * * * *